United States Patent
Bernstein et al.

(10) Patent No.: US 6,873,728 B2
(45) Date of Patent: Mar. 29, 2005

(54) VERTICAL BLACK LINE REMOVAL IMPLEMENTATION

(75) Inventors: Lawrence J. Bernstein, Honeoye Falls, NY (US); Yongchun Lee, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 618 days.

(21) Appl. No.: 10/050,207

(22) Filed: Jan. 16, 2002

(65) Prior Publication Data

US 2003/0133608 A1 Jul. 17, 2003

(51) Int. Cl.$^7$ ................................................ G06K 9/00
(52) U.S. Cl. ....................... 382/163; 382/170; 382/275; 348/246; 358/463
(58) Field of Search ................................ 382/163, 170, 382/174, 202, 270, 275, 289, 304; 348/241, 246, 247; 358/463; 700/4, 5

(56) References Cited

U.S. PATENT DOCUMENTS

| | | | |
|---|---|---|---|
| 5,214,470 A | * 5/1993 | Denber | 355/75 |
| 5,579,414 A | * 11/1996 | Fast et al. | 382/254 |
| 5,668,898 A | * 9/1997 | Tatsuta | 382/290 |
| 6,023,534 A | * 2/2000 | Handley | 382/275 |
| 6,034,794 A | * 3/2000 | Suganuma | 358/518 |
| 6,282,326 B1 | 8/2001 | Lee et al. | 382/289 |
| 6,317,223 B1 | 11/2001 | Rudak et al. | 358/275 |
| 6,393,161 B1 | * 5/2002 | Stevenson et al. | 382/275 |

OTHER PUBLICATIONS

Kim et al., "Nonlinear Operators for Edge Detection and Line Scratch Removal," Conf. on Systems, Man and Cybernetics, V. 5, Oct. 11–14, 1998, pp. 4401–4404: Sects. 2 & 3.*

Morris et al., "A Sampling Based Approach to Line Scratch Removal from Motion Picture Frames," Proc. Of the Int'l Conf. on Image Processing, vol. 1, Sep. 16–19, 1996, pp. 801–804.*

Joyeux et al., "Film Line Scratch Removal Using Kalman Filtering and Bayesian Restoration," 5th IEEE Workshop on Applications of Computer Vision, Dec. 4–6, 2000, pp. 8–13.*

* cited by examiner

*Primary Examiner*—Bhavesh M. Mehta
*Assistant Examiner*—Yubin Hung
(74) *Attorney, Agent, or Firm*—Nixon Peabody LLP (57) ABSTRACT

A vertical black line removal system (VBLR) is adapted to remove unwanted vertical lines produced on scanned document images by dust or other particles on the imaging apparatus. The VBLR system, placed in a document scanner after the binarization equipment, creates a stored histogram table including the difference values of "1" or "0" for the first and second image data. A vertical black line search processor compares each histogram value in the histogram table with a predetermined threshold value such that when the histogram value is greater than the threshold value the histogram value and the image address indicating the location of defect are stored in memory. An image readout then creates a corrected image by comparing each original image address with the stored defect image addresses so that when there is not a match with defect image addresses the first binary image value is output, and when the addresses are equal the difference value is analyzed for a "1" or "0" to determine when the first or second image data is to be output.

14 Claims, 7 Drawing Sheets

VERTICAL BLACK LINE REMOVAL IMPLEMENTATION

FIELD OF THE INVENTION

The invention relates to vertical black line removal (VBLR) processing which addresses the creation of unwanted vertical lines on images produced by document scanners or copiers. By utilizing two different contrast settings during binarization processing, for example, ATP 1 (normal contrast setting or gradient threshold), and ATP2 (low contrast setting or gradient threshold), the VBLR processing hardware described in this invention disclosure is able to detect and correct for vertical black line artifacts.

BACKGROUND OF THE INVENTION

The unwanted vertical lines mentioned above do not exist on the documents themselves, but are caused by dust or other particles on the imaging guides in the scanner through which the document is imaged. Because the particles or dust are dynamic in nature, sensitivity or gain pattern correction methods used to "calibrate" the scanner will not address this problem. The particles will generally show up as black or white pixels at the same horizontal location in every or a majority of lines of the image (column artifact). These image artifacts make the scanned images more objectionable to a human viewer and cause the host-based optical character recognition (OCR) operation to be more difficult and error-prone. The contrast enhancement or adaptive threshold processing (ATP) signal processing steps that are used in binarizing the grayscale image can further aggravate the problem. Prior art methods for removal of VBLR scanner artifacts consisted of host "PC" processing of the scanner images, which if performed "on the fly", effect scanner productivity. Another drawback of host VBLR processing is that in order to reliably detect and correct VBLR artifacts, the 8-bit grayscale image file needs to be available to the host (versus a bi-tonal image file) and image de-skew needs to be disabled.

SUMMARY OF THE INVENTION

The object of the VBLR system of the invention is to provide a "real-time" digital apparatus and method for the vertical black line removal algorithm disclosed in U.S. Pat. Nos. 6,282,326 and 6,317,223. The current design embodiments handle data rates up to 45 Mpixel/sec but with the selection of faster components, the approach could be easily extended to higher pixel rates.

In one embodiment of the vertical black line removal system of the invention is employed after binarization in a bi-tonal image processing system of a document scanner, where the binarization performs processing of each cross track pixel of a linear sensor to create a first binary image value by employing a normal contrast setting and a second binary image value by employing a low-contrast setting. The vertical black line removal system and method includes:

a processing means that defines a difference value indicative of either a potential vertical black line defect or no vertical black line defect and defines a histogram value for each corresponding cross track sensor pixel;

a first storage means for storing each histogram value from the processing means wherein a cross track sensor pixel address for each pixel relates to a histogram value address;

a vertical black line search processing means which compares each stored histogram value with a predetermined threshold value to define a defect list of cross track sensor pixel addresses corresponding to a vertical black line defect; and an output means operating only after the vertical black line search processing means has compared all stored histogram values to complete the defect list of addresses wherein the output means would output either a first normal binary image value or a second low contrast binary image value depending on whether a vertical black line defect exists at that particular pixel location.

In another embodiment of the vertical black line removal system of the invention the vertical black line removal system and method includes:

a processing means which for each cross track sensor pixel defines a difference value indicative of either a potential vertical black line defect or no vertical black line defect and defines a histogram value equal to the sum of all the difference values for each corresponding cross track sensor pixel address;

a first storage means for storing the histogram value from the processing means wherein the cross track sensor pixel address for each pixel relates to each histogram value address;

a vertical black line search processing means which compares each stored histogram value with a predetermined threshold value to define a defect list of those the cross track sensor pixel addresses corresponding to a vertical black line defect;

a second storage means for temporarily storing at least two of the first binary image value, the second binary image value, and the difference value; and an output means operating only after the vertical black line search processing means has compared all stored histogram values to complete the defect list of addresses wherein the output means compares each corresponding cross track sensor pixel address of the binary image values in the second storage means with each address in the defect list such that 1) when the compared addresses are not the same the first binary image value is output, and 2) when the compared addresses are equal and the difference value defines a potential vertical black line defect the second binary image value is output otherwise the first binary image value is output.

In another embodiment of the vertical black line removal system of the invention the vertical black line removal system and method includes:

a processing means for creating a difference value indicative of either a potential vertical black line defect or no vertical black line defect for each cross track sensor pixel and a histogram value for each cross track sensor pixel equal to the sum of all the difference values;

a first storage means for storing the histogram value from the processing means wherein the cross track sensor pixel address for each pixel relates to each histogram value address;

a vertical black line search processing means for comparing each stored histogram value for each cross track sensor pixel address with a predetermined threshold value wherein the result of the comparison relates to the cross track sensor pixel address for a vertical black line defect which is temporarily stored;

a second storage means for temporarily storing at least two of the first binary image value, the second binary image value, and the difference value; and an output means which operates only after the vertical black line search processing means has compared all stored histogram values with the threshold value wherein the output means compares the cross track sensor pixel address for the binary image values in the second storage means with the cross track pixel sensor addresses for all vertical black line defects such that 1) when the compared addresses are not the same the first binary image value is output, and 2) when the compared addresses are equal and the difference value at that particular pixel in the second storage means defines a potential vertical black line defect the second binary image value is output otherwise the first binary image value is output.

In still another embodiment of the vertical black line removal system of the invention the vertical black line removal system and method includes:

a processing means for creating a histogram value and a difference value for each cross track sensor pixel by a comparing the first binary image value and the second binary image value wherein if the first binary image value is equal to the second binary image value then the difference value is zero, and if the first binary image value is not equal to the second binary image value then the difference value is one and the histogram value is sum of all the difference values;

a first storage means for storing each histogram value from the processing means employing the cross track sensor pixel address for each pixel to define each histogram value address;

a vertical black line search processing means for comparing each stored histogram value for each cross track sensor pixel address with a predetermined threshold value wherein when the histogram value is greater than the threshold value the histogram value and cross track sensor pixel address for a vertical black line defect are stored;

a second storage means for temporarily storing at least two of the first binary image value, the second image value, and the difference value; and an output means for comparing each cross track sensor pixel address in the second storage means with the cross track pixel sensor addresses for all stored vertical black line defects and which operates only after the vertical black line search processing means has completed the threshold value comparison for each histogram value wherein when the cross track sensor pixel address in the second storage means is not equal to the cross track sensor pixel address of a vertical black line defect then the first image value is output and when the cross track sensor pixel address in the second storage means is equal to the cross track sensor pixel address of a vertical black line defect then the difference value is evaluated such that when the difference value at that particular pixel is equal to one the second image value is output and when the difference value is equal to zero the first image value is output.

Each embodiment of the invention utilizes a small FPGA for "real-time" defect detection and correction processing and the image data management aspects of vertical black line removal (VBLR). The embodiments of the invention further include the capability to track multiple documents contained within the VBLR (including mixed sized document batches) processing block and the ability to handle skew corrected (de-skewed) images. In one preferred embodiment, an external SDRAM, or other type of DRAM, is used as temporary storage of image data while the VBLR histogram defect data is being collected and also to buffer the image until the VBLR corrected image is readout. One individual SRAM or two external SRAMs in an interleaved fashion are used to facilitate the very fast read modify write circuitry that is needed in creating a histogram of VBLR defects. Implementing a content addressable memory (CAM) within the FPGA allows for a very fast and space efficient implementation to identify and correct the dynamically changing VBLR defect locations. An external CPU can assist the VBLR operation by performing single or multiple functions such as multiple document tracking, providing document parameter information to the VBLR, and performing analysis of VBLR defect data to determine the need for scanner cleaning, for example by issuing an image-guide-cleaning warning message.

DETAILED DESCRIPTION OF THE INVENTION

The VBLR hardware processing block is to be placed in the scanners bi-tonal processing chain after the image binarization and the optional de-skew, and therefore will operate on a bi-tonal image data that may also be de-skewed. The VBLR FPGA requires two or three external components to satisfy the VBLR operating requirements. An SDRAM functions as the VBLR image buffer to provide temporary storage of the image data until the VBLR "search" processing has completed and the VBLR corrected image is outputted. One or two SRAMs are used to store the histogram results of the "search" image until the VBLR defects are identified. An interface to the CPU provides the means to read/write VBLR registers, interrupt handling and to temporarily store VBLR defect addresses and the associated VBLR histogram values.

If an image is de-skewed in a prior image processing step, the unwanted vertical black lines can now show up as diagonal lines that are at the angle at which the document was scanned. With the image being de-skewed, VBLR will need to calculate the original cross-track pixel location for each input pixel data value going into VBLR in order to build the desired VBLR histogram address which corresponds directly to the cross-track pixel location. When de-skew processing is not present, setting the de-skew angle to 0 degrees ($X_{minor}=1$, $X_{major}=0$) would be used. By sending the same data into both data inputs (ATP_1 and ATP_2), the VBLR processing block can also pass through bi-tonal data from dithering, error diffusion or some other type of binarization processes unaltered. The VBLR corrected output image data (VBLR_DATA) continues on to the remaining conventional bi-tonal operations, such as despeckle/half-tone removal, border reduction, and compression.

Figure 2:
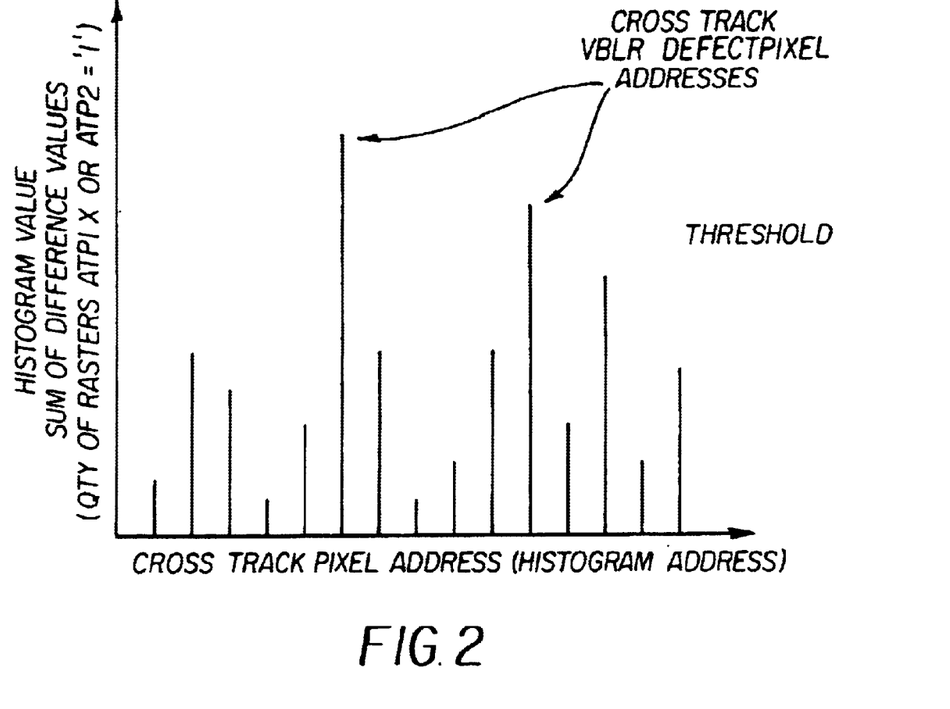
FIG. 2 illustrates the VBLR histogram operation which creates a histogram of the Sum of the Difference Image values (for example the ATP1 XOR ATP2) vs. cross track pixel location. At the completion of every image, the histogram value at each address is compared against a threshold value and those address(es) which exceed the threshold value are designated as the cross-track pixel location(s) which have VBLR defects.

The first step of VBLR is creating a histogram where the histogram bin number corresponds to the original cross-track pixel location and the value in each histogram bin corresponds to the number of occurrences (rasters) where an unwanted defect may have been detected in the scanned image at that present pixel location. The vertical black line detection method involves using the binary image data generated from the two different contrast setting outputs of the binarization processing (for example ATP). One contrast setting (ATP1) is the normal binarization contrast setting used for binarization; the second signal (ATP2) is with the binarization set with a low contrast threshold that will not produce lines due to artifacts or particulates but would remove desired low contrast document details. A histogram based on the difference of these two binary images (ATP 1 XOR ATP2) will be created whose results will be used to determine where to apply VBLR correction. An example of the VBLR histogram generated is shown in FIG. 2.

The histogram information can be stored in one or two external SRAMs (SRAM1 and SRAM2). For high data rate applications, data storage will be pixel interleaved into the two histogram SRAMs in order to meet the pixel rate read modify write requirement. It also maybe feasible, if a sufficient amount internal SRAM resources are available in the FPGA device, to integrate the histogram SRAM function inside of the FPGA. The required operations per pixel period are: read current histogram value from SRAM; add Difference_Image (Difference_Image is a '0' or '1') to current histogram value; and then write the new histogram value back to the SRAM.

To generate the desired VBLR histogram (defects along a vertical line or column), the addresses into the histogram SRAM(s) need to correspond to the cross-track sensor pixel locations going into de-skew. Therefore, it is necessary to undo the de-skew process using the $X_{minor}$, $X_{major}$, and angle clockwise parameters used by the de-skew processing. The SRAM histogram address is calculated by incrementing an accumulator with $X_{minor}$ or for each pixel/raster input into VBLR and resetting the accumulator to zero at the start of each raster. The $X_{major}$ accumulator will add or subtract $X_{major}$ for each raster/document input to VBLR to the $X_{minor}$ accumulator output. The sign of $X_{major}$ is determined by the angle clockwise parameter which indicates whether the document is skewed clockwise (+) or counter-clockwise (−). See the equation below.

$$\text{Cross\_Track\_Pixel\_Location} = \sum_{n=0}^{n=(scan\_width-1)} xminor \pm \sum_{m=0}^{m=(length-1)} xmajor$$

Where: $X_{minor}$=COS (skew angle), $X_{major}$=SIN (skew angle), n=VBLR input pixel count/raster, and m=VBLR input raster count/document.

Figure 3A:
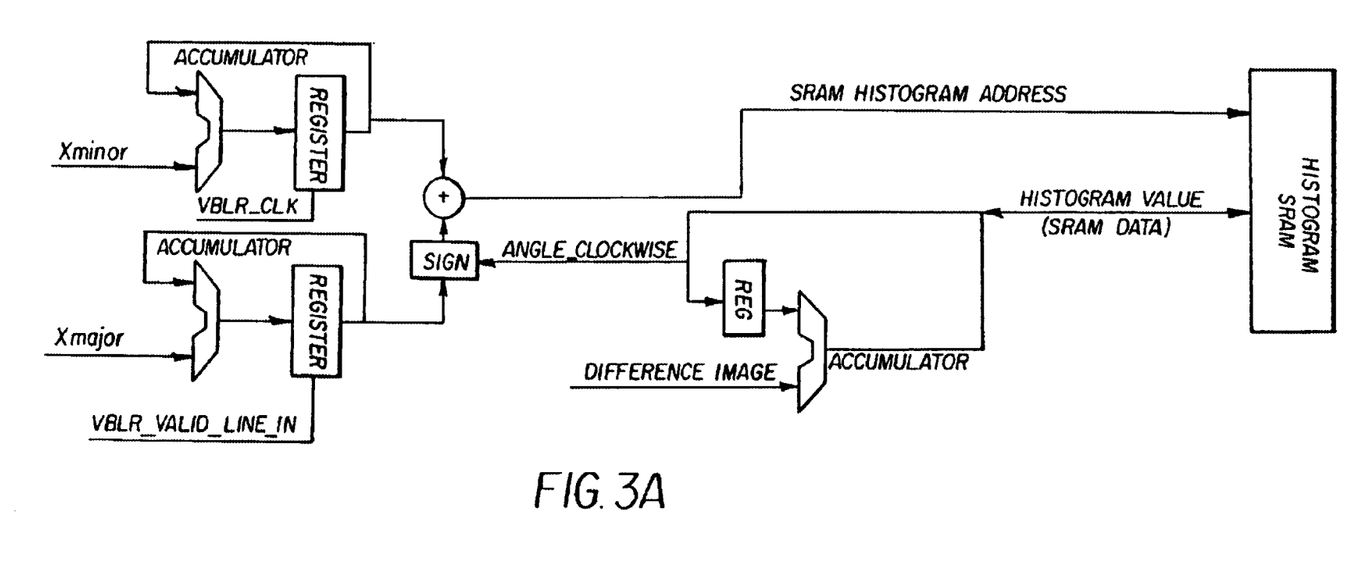
FIGS. 3A and 3B illustrate a VBLR search processing block diagram (timing shown at 33 Mpixel/sec) and SRAM interface—the FIG. 3A diagram shows the histogram SRAM interface block diagram details, SRAM address generation and read modify write sections. The FIG. 3B block diagram details the VBLR search processing operation including the SEARCH_CONTROL state machine, formatting the binarization, (for example ATP 1 and Difference_Image) data inputs for writing to the SDRAM Image Buffer Interface, image parameter storage and VBLR histogram defect determination.
Figure 3B:
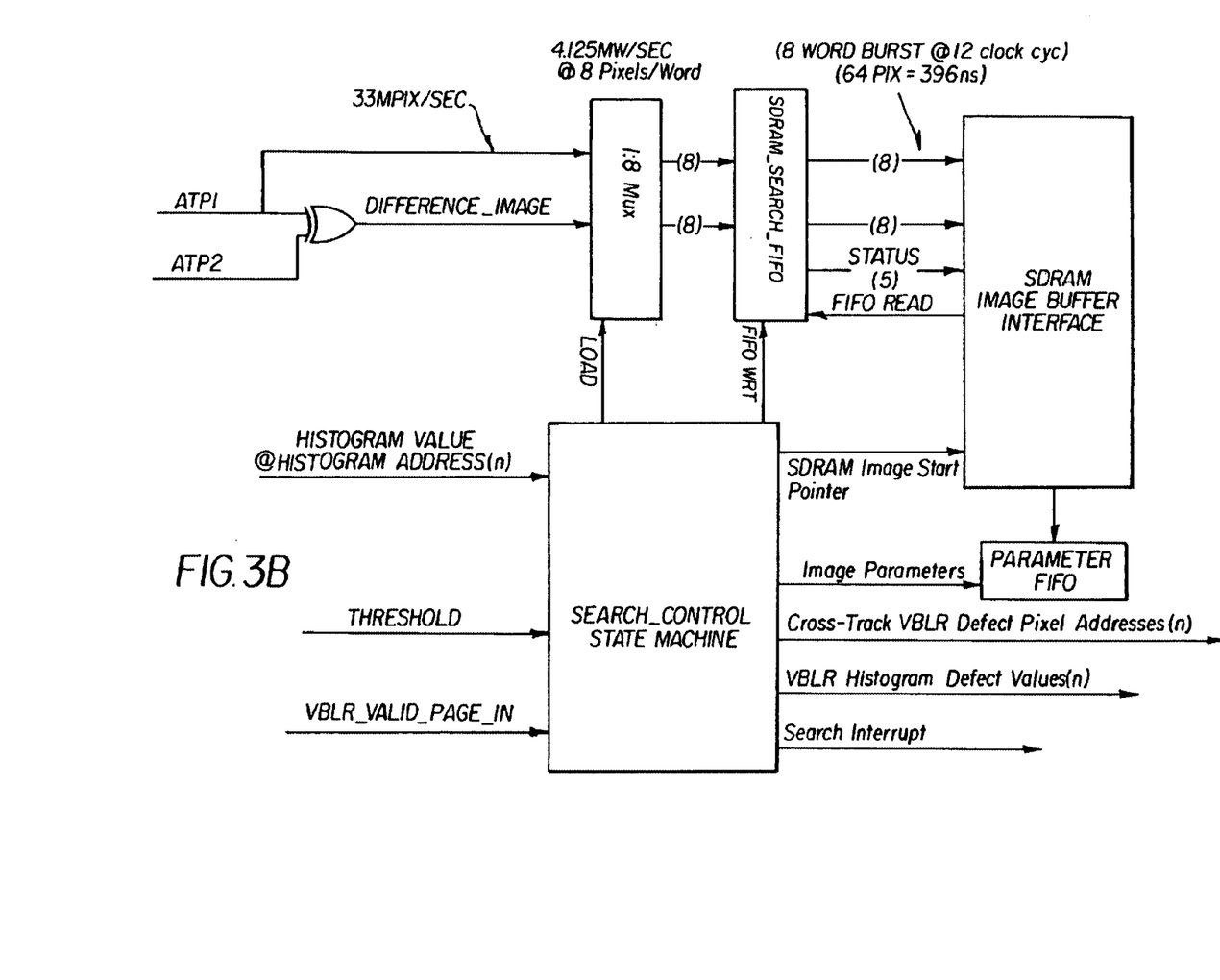

FIGS. 3A and 3B illustrate the main operational features in the "Search" processing portion of the VBLR processing. In parallel with the histogramming operation, the normal contrast (ATP1) and Difference binary images are written temporarily into the SDRAM_SEARCH_FIFO. The SDRAM_COMMAND state machine in the SDRAM Image Buffer Interface manages the FIFO readout by monitoring the FIFO status (quantity of words in the FIFO) and the SEARCH_CORRECT state. The SDRAM_COMMAND state machine will ensure the two data buffering FIFOs (SDRAM_SEARCH_FIFO, SDRAM_CORRECT_FIFO) are serviced in order of priority and will issue the desired memory instruction to the SDRAM_CONTROL state machine. The SDRAM memory control and signal generation is handled by the SDRAM_CONTROL state machine where all memory transfers to the external SDRAM are shown using bursts of 8 words×16 bits (64 pixels). The SDRAM_CONTROL state machine also handles memory initialization and refresh operations.

The second step of VBLR takes place between the inputting of document pages (after the falling edge of VBLR_VALID_PAGE_IN). The sequencing of the operations are controlled by the SEARCH_CONTROL state machine. First, the histogram information is readout from the histogram SRAM(s) (Note: only one histogram SRAM shown). In the case of where two SRAMs are used, the data (histogram value) from each individual SRAM would be summed together prior to thresholding. At each SRAM address, the histogram value is compared with the threshold parameter provided by the CPU to determine if that location is to be considered as having a defect (when the Sum of Difference Values>threshold). The CPU programmable threshold parameter is used to control the sensitivity of when the vertical black line correction becomes active and to also scale the threshold parameter by the document length. In the case when a VBLR defect is identified, the histogram bin location which corresponds to the original horizontal cross-track sensor pixel address and the data value in the histogram bin which exceeded the programmed threshold parameter will be stored temporarily internal to the VBLR FPGA. After comparison and defect storage is completed for all SRAM memory locations, the histogram SRAM(s) will be initialized in preparation for the next document. After initializing the histogramming SRAMs, the VBLR FPGA interrupts the CPU that an input image has been completely stored in the VBLR SDRAM memory buffer and the VBLR histogram results are ready by asserting the Search_Interrupt signal. The CPU will readout and temporarily store the VBLR_Defect_Pixel_Address(es) and the associated Histogram Values for further analysis prior to the VBLR correction processing. An alternative implementation requires the CPU read the complete histogram value data set for an image which would then apply the thresholding operation directly to determine the VBLR_Defect_Pixel_Address(es).

The input document's $X_{Minor}$ (x pixel increment), $X_{Major}$ (y pixel increment), Angle Clockwise (skew direction), Scan Width (pixels/raster), Length (rasters/document) parameters and SDRAM Image Start Pointer will then be written into the Parameter FIFOs to be utilized for the third step. At the start of the next document, on the rising edge of VBLR_VALID_PAGE_IN, the most recent $X_{Minor}$, $X_{Major}$, Angle_Clockwise, Scan Width, Length and Threshold parameters sent by the CPU will be loaded for the first step for the following document.

It is important to note that a VBLR corrected image cannot start outputting until the histogram operation is completed for an input image (at least one image is stored in the VBLR SDRAM image buffer) and the previous VBLR corrected image has been completely readout. Thus, the VBLR FPGA has at least 1 page latency with common-sized documents and much greater than one page latency when many smaller-sized documents follow a large one.

The correct_defect_address values for an image are to be loaded prior to the CPU issuing a correct_image_trigger command. These defect address values are written into a content addressable memory (Defect_Cam) in the Correct_Addr_Compare section of the correct processing, as shown in the VBLR correction block diagram of FIG. 6.

Figure 6:
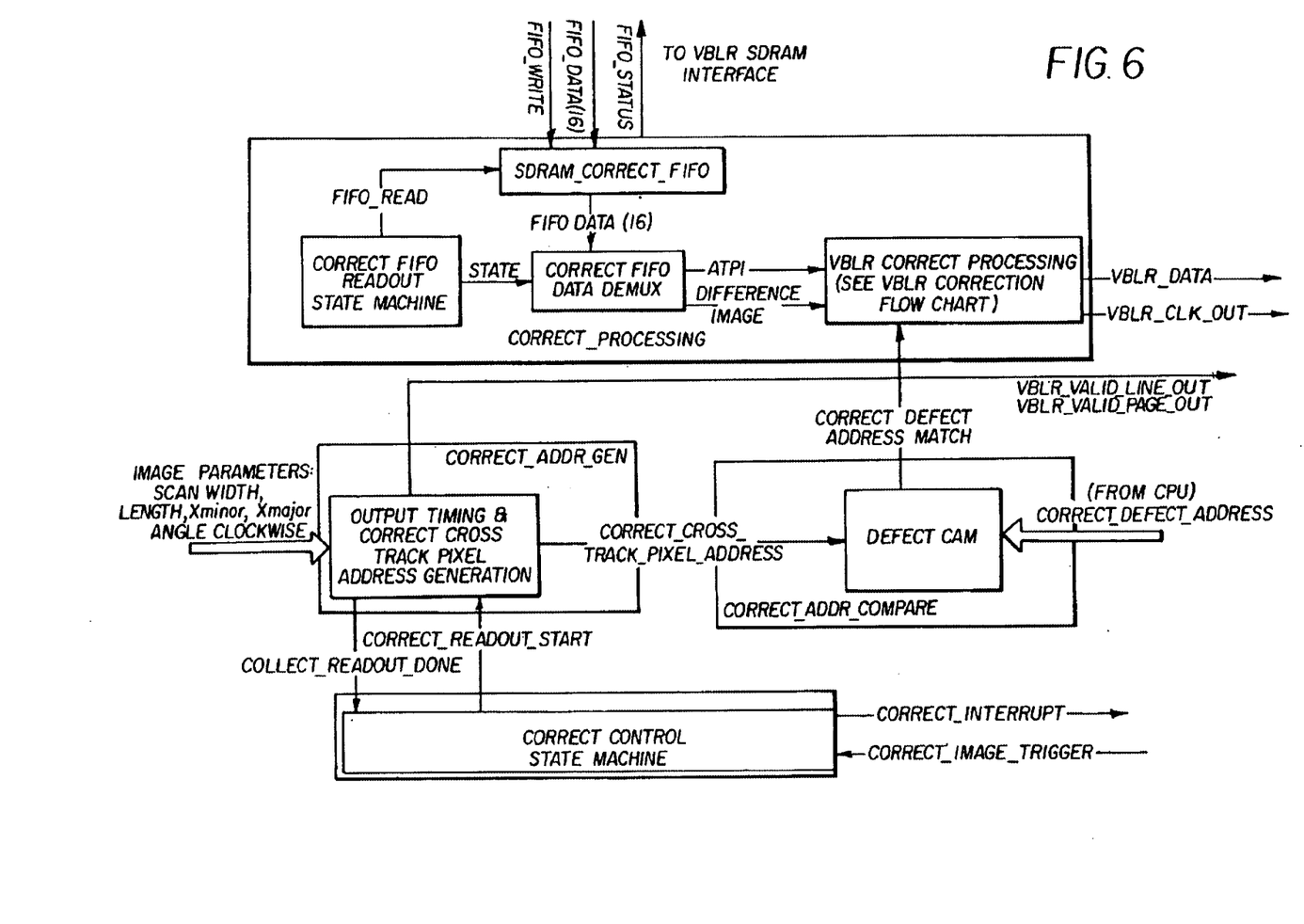
FIG. 6 is a VBLR correction block diagram—The block diagram details the VBLR correction processing including the CORRECT_CONTROL state machine controller, output timing and cross track pixel address generation, a defect CAM which flags VBLR defect address matches and the VBLR correct processing data path.

Image readout is initiated with the correct_image_trigger signal. Both the normal contrast (ATP1) and Difference binary images are readout in bursts of 8 words×16 bits (64 pixels) from the SDRAM in the same order that it was inputted and will be temporarily written into the SDRAM_CORRECT_FIFO. The image data readout of the SDRAM_CORRECT_FIFO is de-multiplexed and serialized into two serial data streams (normal contrast (ATP1) and Difference Image) which is then processed with the VBLR correction algorithm.

Figure 4:
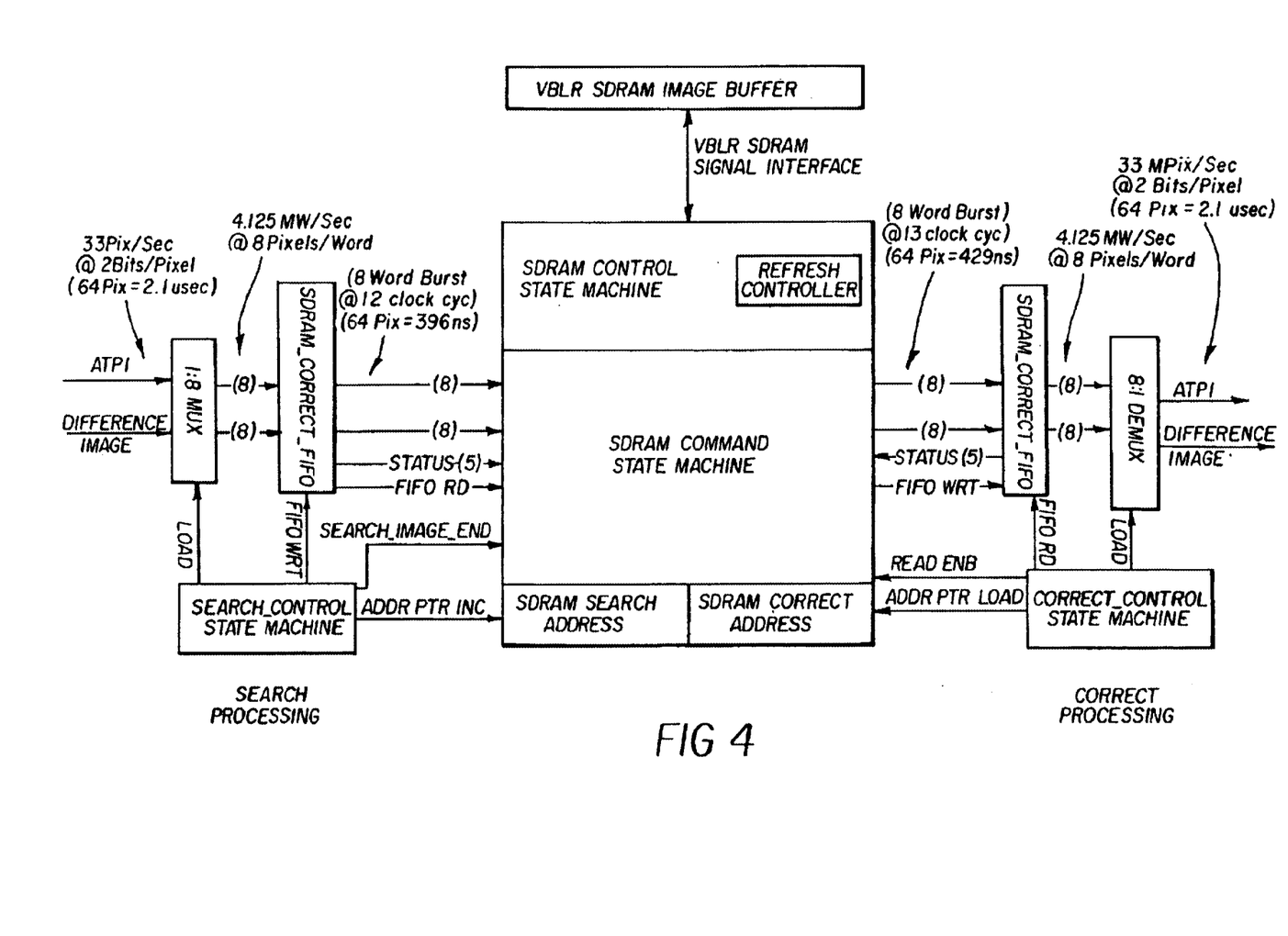
FIG. 4 is a VBLR Image Buffer Interface block diagram (timing shown at 33 Mpixel/sec)—VBLR Image Buffer Interface block diagram pertains to the major functions involving the SDRAM image buffer including the data written from the search processing section of VBLR, data read by the correction processing of VBLR, VBLR SDRAM signal interface, SDRAM address generation, SDRAM refresh controller, SDRAM_CONTROL state machine and SDRAM_COMMAND state machine.

The SDRAM read operation is controlled by the SDRAM_COMMAND_STATE state machine in the SDRAM Image Buffer Interface which manages the FIFO readout by monitoring the SDRAM_CORRECT_FIFO status (quantity of words in the FIFO) and the CORRECT_CONTROL state machine status. The actual SDRAM memory control and signal generation is handled by the SDRAM_CONTROL_STATE state machine where all memory transfers to the external SDRAM are in burst of 8 words×16 bits (64 pixels).

Figure 1:
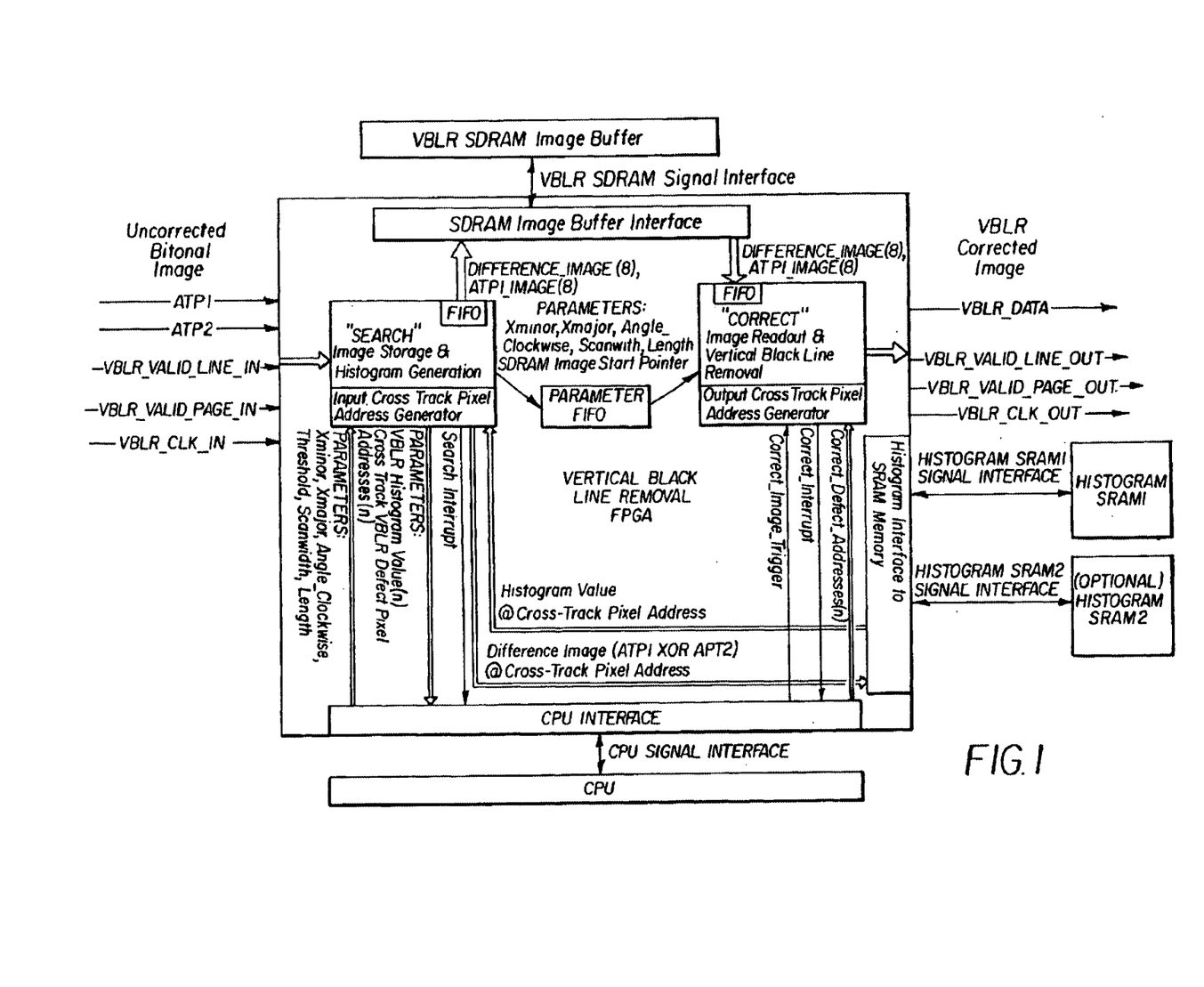
FIG. 1 is a VBLR block diagram—The high level signal processing block diagram showing VBLR FPGA operation and interfaces to Histogram SRAM(s), VBLR SDRAM image buffer, CPU and scanner signal processing path.

The Correct_Addr_Gen block creates the timing for the "VBLR corrected" output image and will maintain the scan width and length of the image in accordance with parameters provided by the parameter FIFO. The Correct_Cross_Track_Pixel_Address, which corresponds to the original cross-track sensor pixel location, is recalculated using the same method as described in the search processing while the image data is being readout of the SDRAM. The Defect_CAM (content addressable memory) in the Correct_Addr_Compare block will determine when the Correct_Defect_Address_Match is active ('1') (that is when Correct_Cross_Track_Pixel_Address=Correct_Defect_Address). Whenever the Correct_Defect_Address_Match is active, it is considered to be where a VBLR artifact, due to dust, is present on the image guides and thus, where to apply the VBLR correction algorithm shown in FIG. 5. The external CPU, see FIG. 1, assists the VBLR FPGA by performing functions such as multiple document tracking and providing document parameter information to the VBLR. The CPU can perform further image analysis of VBLR defect data, for example by performing analysis of the histogram values and cross track sensor pixel addresses for vertical black line defects resulting from the vertical black line search process, to determine when the number of defects reaches a level indicating that scanner cleaning should be performed. For example, by issuing an image-guide-cleaning warning message. The CPU can also perform further image analysis to determine when to expand the VBLR defect region to neighboring pixels.

Figure 5:
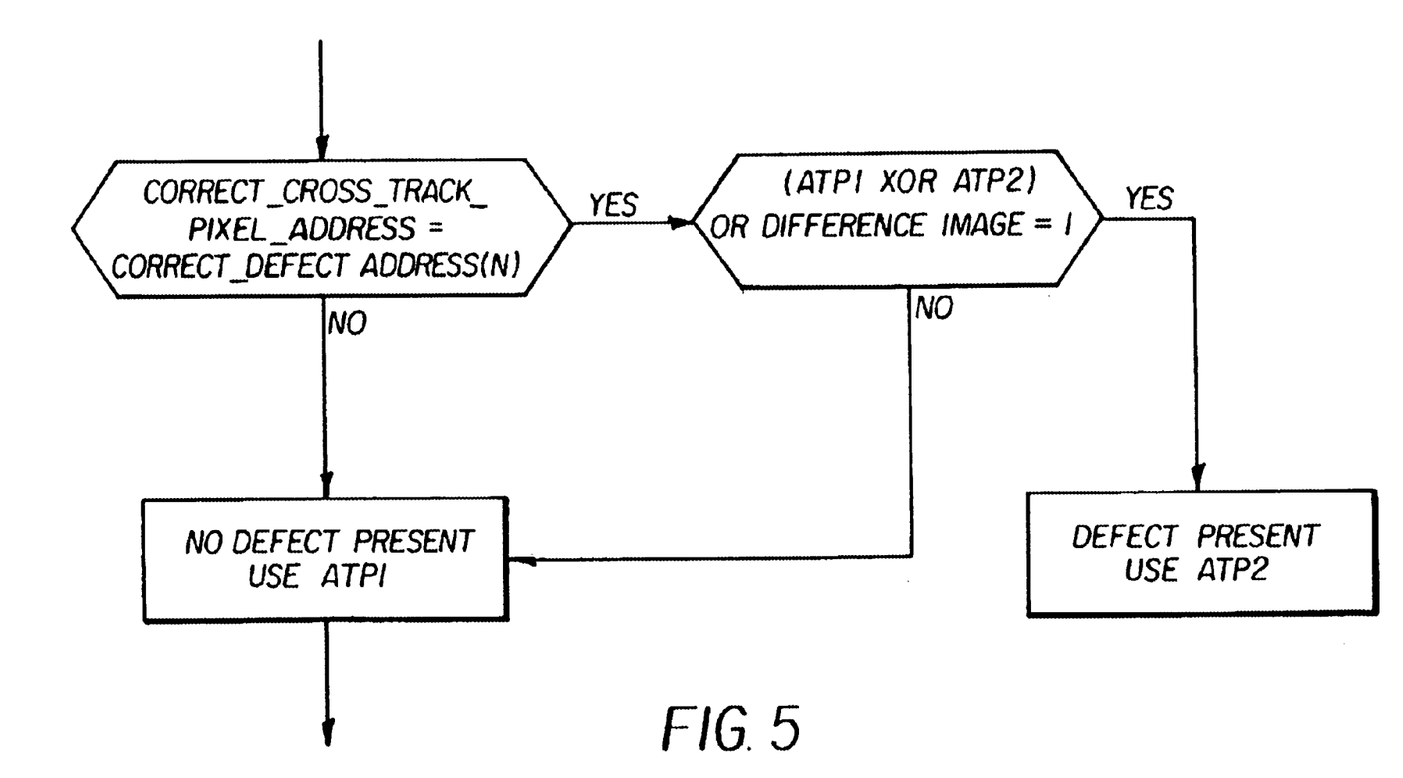
FIG. 5 is a VBLR correction flow chart—This diagram illustrates using a flow chart method the VBLR processing algorithm which is applied to every pixel as it exits the VBLR correction block.

The VBLR correction algorithm in FIG. 5 initially compares the Correct_Cross_Track_Pixel_Address with the Correct Defect Address locations stored in the Defect CAM and if not equal then no defect is present and the normal contrast image information (e.g., ATP1 image information) is output. If the values of the Correct_Column_Address match one of the Correct Defect Addresses stored in the Defect_CAM, then the following logic is applied. When the Difference_Image value is not equal to '1' then no defect is present and the normal contrast image information (e.g., ATP1 image information) is outputted, however, if the Difference_Image value is equal to '1', then the low contrast information (e.g., ATP2 image information) is outputted instead.

The outputs from the VBLR processing block are VBLR_DATA which is the vertical black line corrected bi-tonal data signal, VBLR_VALID_LINE_OUT which indicates the valid data interval of the raster as well as when a new raster begins, and the VBLR_VALID_PAGE_OUT which indicates when a document begins and ends. An output pixel clock VBLR_CLK_OUT is provided for synchronization of the data and control output signals from VBLR.

When the VBLR correction image readout process is completed (the previous image has been completely readout), the Correct_Interrupt signal will become active indicating to the CPU that the output correction processing is in a "ready" condition (no readout in progress) and the VBLR is ready to output the next image, if one is queued in the VBLR image buffer. The invention has been described in detail with particular reference to certain preferred embodiments thereof, but it will be understood that variations and modifications can be effected within the scope of the invention.

What is claimed is:

1. A vertical black line removal system in a document scanner which includes a binarization system comprising:
   a. processing means that defines a difference value indicative of either a potential vertical black line defect or no vertical black line defect and defines a histogram value for each corresponding cross track sensor pixel;
   b. first storage means for storing each histogram value from the processing means wherein a cross track sensor pixel address for each pixel relates to a histogram value address;
   c. vertical black line search processing means which compares each stored histogram value with a predetermined threshold value to define a defect list of cross track sensor pixel addresses corresponding to a vertical black line defect; and
   d. output means operating only after the vertical black line search processing means has compared all stored histogram values to complete the defect list of addresses wherein the output means would output either a first normal binary image value or a second low contrast binary image value depending on whether a vertical black line defect exists at that particular pixel location.

2. A vertical black line removal system operating after binarization in a bi-tonal image processing system of a document scanner, wherein the binarization creates a first normal contrast binary image value and creates a second low contrast binary image value, comprising:

a. processing means which for each cross track sensor pixel defines a difference value indicative of either a potential vertical black line defect or no vertical black line defect and defines a histogram value equal to the sum of all the difference values for each corresponding cross track sensor pixel address;

b. first storage means for storing the histogram value from the processing means wherein the cross track sensor pixel address for each pixel relates to each histogram value address;

c. vertical black line search processing means which compares each stored histogram value with a predetermined threshold value to define a defect list of those cross track sensor pixel addresses corresponding to a vertical black line defect;

d. second storage means for temporarily storing at least two of the first binary image value, the second binary image value, and the difference value; and e. output means operating only after the vertical black line search processing means has compared all stored histogram values to complete the defect list of addresses wherein the output means compares each corresponding cross track sensor pixel address of the binary image values in the second storage means with each address in the defect list such that 1) when the compared addresses are not the same the first binary image value is output, and 2) when the compared addresses are equal and the difference value defines a potential vertical black line defect the second binary image value is output otherwise the first binary image value is output.

3. A vertical black line removal system for use after binarization in a bi-tonal image processing system of a document scanner, wherein the binarization performs processing of each cross track sensor pixel to create a first binary image value by employing a normal contrast setting and to create a second binary image value by employing a low-contrast setting, comprising:

a. processing means for creating a difference value indicative of either a potential vertical black line defect or no vertical black line defect for each cross track sensor pixel and a histogram value for each cross track sensor pixel equal to the sum of all the difference values;

b. first storage means for storing the histogram value from the processing means wherein the cross track sensor pixel address for each pixel relates to each histogram value address;

c. vertical black line search processing means for comparing each stored histogram value for each cross track sensor pixel address with a predetermined threshold value wherein the result of the comparison related to the cross track sensor pixel address for a vertical black line defect which is temporarily stored;

d. second storage means for temporarily storing at least two of the first binary image value, the second binary image value, and the difference value; and e. output means which operates only after the vertical black line search processing means has compared all stored histogram values with the threshold value wherein the output means compares the cross track sensor pixel address for the binary image values in the second storage means with the cross track pixel sensor addresses for all vertical black line defects such that 1) when the compared addresses are not the same the first binary image value is output, and 2) when the compared addresses are equal and the difference value at that particular pixel in the second storage means defines a potential vertical black line defect the second binary image value is output otherwise the first binary image value is output.

4. A vertical black line removal system for use after binarization in a bi-tonal image processing system of a document scanner, wherein the binarization performs processing of each cross track sensor pixel to create a first binary image value by employing a normal contrast setting and to create a second binary image value by employing a low-contrast setting, comprising:

a. processing means for creating a histogram value and a difference value for each cross track sensor pixel by a comparing the first binary image value and the second binary image value wherein if the first binary image value is equal to the second binary image value then the difference value is zero, and if the first binary image value is not equal to the second binary image value then the difference value is one and the histogram value is sum of all the difference values;

b. first storage means for storing each histogram value from the processing means employing the cross track sensor pixel address for each pixel to define each histogram value address;

c. vertical black line search processing means for comparing each stored histogram value for each cross track sensor pixel address with a predetermined threshold value wherein when the histogram value is greater than the threshold value the histogram value and cross track sensor pixel address for a vertical black line defect are stored;

d. second storage means for temporarily storing at least two of the first binary image value, the second image value, and the difference value; and e. output means for comparing each cross track sensor pixel address in the second storage means with the cross track pixel sensor addresses for all stored vertical black line defects and which operates only after the vertical black line search processing means has completed the threshold value comparison for each histogram value wherein when the cross track sensor pixel address in the second storage means is not equal to the cross track sensor pixel address of a vertical black line defect then the first image value is output and when the cross track sensor pixel address in the second storage means is equal to the cross track sensor pixel address of a vertical black line defect then the difference value is evaluated such that when the difference value at that particular pixel is equal to one the second image value is output and when the difference value is equal to zero the first image value is output.

5. A vertical black line removal system as set forth in any one of claims 1–4, wherein an image deskewing means is located prior to the binarization and the system further comprises:

a second processing means for creating for each deskewed image value a corrected cross track pixel sensor address which corresponds to the original cross track sensor pixel location of a scanned document; and wherein the corrected cross track pixel sensor address for each image value is employed by the search processing and output means.

6. A vertical black line removal system as set forth in any one of claims 1–4, wherein the vertical black line search processing means and processing means for creating a histogram value and difference value operate in parallel.

7. A vertical black line removal system as set forth in any one of claims 1–4, wherein the first storage means comprises at least one SRAM.

8. A vertical black line removal system as set forth in any one of claims 1–4, wherein the first storage means comprises one or two SRAMs wherein when two SRAMs are employed the histogram values are pixel-interleaved into each SRAM.

9. A vertical black line removal system as set forth in any one of claims 2–4, wherein the second storage means comprises a DRAM.

10. A vertical black line removal system as set forth in claim 9, wherein the second storage means comprises an SDRAM.

11. A vertical black line removal system as set forth in claim 4, including content addressable memory means for storing each cross track sensor pixel address for a vertical black line correction resulting from the vertical black line search processing means.

12. A vertical black line removal system as set forth in any one of claims 1–4, including an additional processing means for performing functions selected from the group consisting of multiple document page tracking, providing scanned document page parameters to the output means for generating the new cross track pixel sensor addresses, performing analysis of the histogram values and cross track sensor pixel addresses for a vertical black line defect resulting from the vertical black line search processing means to output scanner cleaning instructions, and combinations thereof.

13. A method for performing vertical black line removal from a scanned document image after binarization of the image comprising the steps of:

a. creating for each cross track sensor pixel of the scanned image a difference value indicative of either a potential vertical black line defect or no vertical black line defect and a histogram value;

b. initially storing the histogram value wherein a cross track sensor pixel address for each cross track sensor pixel relates to each histogram value address;

c. performing a vertical black line search by comparing each stored histogram value with a predetermined threshold value to define a defect list of the cross track sensor pixel addresses corresponding to a vertical black line defect; and d. after the vertical black line search has compared all stored histogram values, outputting either a first normal binary image value or a second low contrast binary image value depending on whether a vertical black line defect exists at a cross track sensor pixel address for each pixel.

14. A method for performing vertical black line removal from a scanned document image composed of cross track sensor pixels, after binarization of the image creates a first, normal contrast binary image value and a second, low contrast binary image value, comprising the steps of:

a. creating for each cross track sensor pixel of the scanned image a difference value indicative of either a potential vertical black line defect or no vertical black line defect and a histogram value equal to the sum of all the difference values;

b. initially storing the histogram value wherein the cross track sensor pixel address for each cross track sensor pixel relates to each histogram value address;

c. performing a vertical black line search by comparing each stored histogram value with a predetermined threshold value to define a defect list of those the cross track sensor pixel addresses corresponding to a vertical black line defect;

d. temporarily storing at least two of the first binary image value, the second binary image, and the difference value; and e. after the vertical black line search has compared all stored histogram values, outputting image values by comparing each cross track sensor pixel address for the binary image values temporarily stored with each of the cross track pixel sensor addresses in the defect list such that 1) when the compared addresses are not the same the first binary image value is output, or 2) when the compared addresses are equal and the difference value at that particular pixel relates to a potential vertical black line defect the second binary image value is output otherwise the first binary image value is output.

* * * * *